Jan. 24, 1956     J. P. BILISOLY ET AL     2,732,349
METHOD OF PREPARING HYDROFORMING CATALYSTS
Filed May 31, 1951
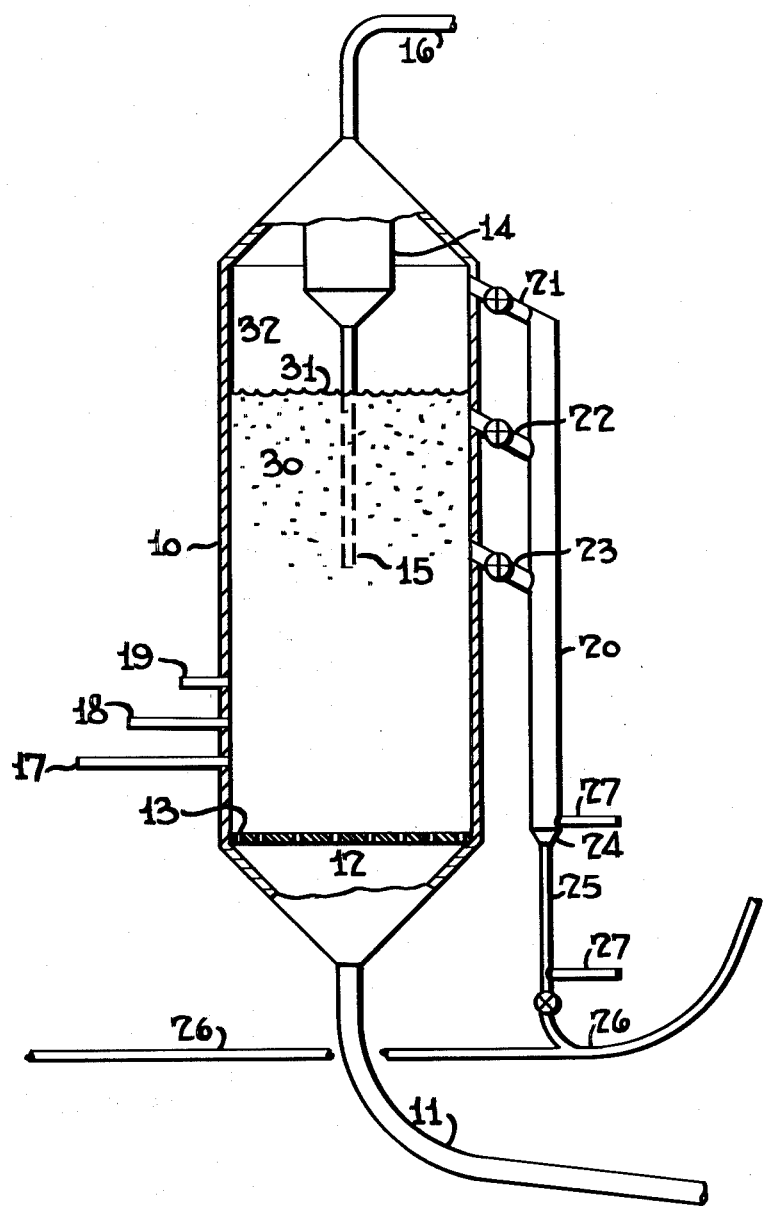
Julius P. Bilisoly
Edward A. Hunter
Joseph A. Polack
Marnell A. Segura
Inventors
By
J. Cushman
Attorney United States Patent Office 2,732,349
Patented Jan. 24, 1956

2,732,349

METHOD OF PREPARING HYDROFORMING CATALYSTS

Julius P. Bilisoly, Edward A. Hunter, Joseph A. Polack, and Marnell A. Segura, Baton Rouge, La., assignors to Esso Research and Engineering Company, a corporation of Delaware Application May 31, 1951, Serial No. 229,244

6 Claims. (Cl. 252—439)

This invention relates to the preparation of catalysts and more particularly to the preparation of platinum- or palladium-containing catalysts which are suitable for the conversion of hydrocarbon fractions boiling in the naphtha range into products of improved anti-knock properties.

Catalysts containing platinum have been described for various processes in the prior art but, in general, commercial use of said catalysts has been limited because of the cost of platinum. Recently considerable interest has been shown in hydroforming processes utilizing certain platinum on alumina catalysts as disclosed in U. S. Patents Nos. 2,479,109 and 2,479,110. In accordance with these patents the alumina support must not be dried prior to compositing with platinum and the final catalyst composition must contain certain percentages of halogen.

It has more recently been found that platinum on alumina catalysts, which are particularly effective for hydroforming naphtha fractions, can be prepared using "activated alumina" of commerce as the catalyst support. In this procedure, the activated alumina is pulverized and dried and then treated with an aqueous solution of hydrogen fluoride until the hydrogen fluoride solution is substantially completely absorbed by the activated alumina. The mixture is allowed to stand for an extended period of time to permit reaction between the hydrogen fluoride and the activated alumina base. The mixture is then dried at a moderate temperature for an extended period of time. The dried mixture substantially at room temperature is granulated and then treated with a solution of a platinum compound such as chloroplantinic acid, or the like until the solution is substantially completely absorbed by the treated activated alumina. Just sufficient water is added with the platinum-containing solution to form a paste and to permit dispersion of the platinum-containing compound throughout the alumina base in a homogeneous manner.

Hydrogen sulfide is then bubbled through or otherwise contacted with the said paste, whereupon the pasty mixture is allowed to stand a short time and is then dried at a moderate temperature. The resulting mixture is broken up into a powder and, if desired, formed into pills. The catalyst in the desired form is then calcined at an elevated temperature. Preferably following the calcination, the catalyst is reduced with hydrogen and is then ready for use in the hydroforming process. As an alternative to the above procedure in which the activated alumina is HF treated and the platinum then precipitated thereon, it is also possible to first soak the activated alumina with the platinum-containing solution, then precipitate the platinum and finally treat the alumina containing the platinum with hydrogen fluoride.

Both of the above procedures are time consuming and require two careful drying operations.

It is the object of this invention to provide a shortened procedure for preparing alumina supported platinum and palladium catalysts.

It is also an object of this invention to provide a shortened procedure for preparing alumina supported platinum and palladium catalysts using activated alumina of commerce as the support.

It is a further object of this invention to prepare alumina-supported platinum and palladium catalysts by a shortened procedure, using activated alumina of commerce as the support, which catalysts are particularly effective in the hydroforming of hydrocarbon fractions boiling within the naphtha range.

These and other objects will appear more clearly from the detailed specification and claims which follow.

It has now been found that platinum on alumina catalysts which are especially suited for hydroforming naphtha fractions can be prepared using activated alumina of commerce as the catalyst support in a substantially shorter period of time than required heretofore by treating the carrier or support such as various activated aluminas, silica-alumina or the like in a fluidized state with hydrogen fluoride admixed with an inert diluent gas such as nitrogen, carbon dioxide or the like at temperatures of from room temperature to 1000° F. to incorporate from 0.2 to 10% of HF in the carrier. The treated carrier is then impregnated with a solution of a platinum or palladium compound to form a wet mix which is subsequently sulfided with hydrogen sulfide followed by drying. An alternative to the above procedure would be to follow up the hydrogen fluoride treatment with a treatment with hydrogen sulfide at room temperature to 500° F. while maintaining the carrier material in a dry, fluidized condition. After sulfiding, the impregnation with a solution of a platinum or palladium salt to deposit 0.05 to 2 wt. per cent of the metal could be accomplished either by atomization from the bottom of the vessel or from a spray arrangement located in the top of the vessel, while simultaneously passing an inert gas or nitrogen through the mass of finely divided particles. The catalyst could then be dried, calcined and activated either in the same vessel or it could be transferred to the hydroforming reactor for final activation and reduction preparatory to putting the catalyst on stream.

Reference is made to the accompanying drawing illustrating one typical form of an apparatus suitable for preparing catalyst compositions in accordance with the present invention.

In the drawing 10 is a vertical cylindrical vessel. A line 11 is connected to the bottom of the vessel 10 for supplying solid catalyst support particles, fluidizing gas and/or reactant materials to the vessel. An inlet chamber 12 is provided at the bottom of the vessel and is superposed by a perforated plate or grid 13 for insuring uniform distribution of the incoming materials over the entire cross section of the vessel. Gaseous products pass overhead from the reactor through a cyclone separator 14 or the like, which removes most of the entrained solid particles from the effluent gas, the separated particles being returned to the reactor vessel proper via the dip leg or pipe 15. The gaseous products substantially free of solid particles are discharged through line 16 to suitable processing or recovery equipment or are vented to the atmosphere. Several taps 17, 18 and 19 connected to suitable sources of supply are provided, preferably near the horizontal distribution plate 13 for supplying hydrogen fluoride or the like, a solution of a compound of the catalytic metal and also a precipitant such as hydrogen sulfide. While separate taps are shown, obviously one tap may be used for introducing more than one of the above mentioned materials. The taps preferably terminate in a nozzle or other means for suitably atomizing any liquid reagents added. If desired, each of the taps may connect to a manifold which in turn connects to a plurality of nozzles which discharge into the reactor vessel proper.

An outlet conduit 20 for the discharge of catalyst particles is arranged alongside the reactor vessel 10 and is connected to the vessel by several valve controlled connector pipes 21, 22 and 23. The lower end of the outlet conduit is necked down at 24 and joined to valve controlled conduit 25, forming therewith a standpipe for developing fluistatic pressure for the discharge of catalyst particles into transfer line 26 and thence to suitable treating equipment. One or more taps 27 may be provided along the discharge conduit 20 and conduit 25 for the introduction of a treating or stripping agent or fluidizing medium.

The method of operating this apparatus is as follows. Finely divided activated alumina or other catalyst support material in a gaseous suspension medium is passed through line 11 into inlet chamber 12 and through distributor grid 13 into the reactor vessel 10. The velocity of the gaseous medium through the reactor vessel is so controlled that a dense, fluidized liquid simulating bed 30 of alumina and gaseous material is formed. The dense bed 30 has a definite level 31 or interface and is superposed by a dilute phase 32. Treating agents are introduced directly into the dense bed 30 through the inlet lines 17, 18 and 19. For example, when the charge of alumina or the like has been introduced into the vessel or during the introduction of the charge, hydrogen fluoride or a mixture of hydrogen fluoride and an inert diluent such as nitrogen is introduced into the dense bed through line 17. When the charge of alumina has been introduced and the desired amount of fluorine has been incorporated therein, the supply of hydrogen fluoride is discontinued and hydrogen sulfide is discharged into the reactor vessel through inlet line 18 and, when sufficient hydrogen sulfide has been incorporated, the supply of hydrogen sulfide is discontinued and a solution of a compound of the catalytic metal is introduced through line 19 and suitable atomization nozzles. When the desired amount of catalytic metal has been incorporated the supply of catalytic metal compound is discontinued. Inert gas such as nitrogen may be supplied continuously to the reactor vessel during the introduction of the various treating agents in order to maintain the alumina particles in fluidized condition. After the treatment of the alumina has been completed the temperature of the fluidized mass may be increased sufficiently to dry and/or calcine the catalyst particles. If desired, the catalyst may then be treated with hydrogen or hydrogen-containing gas in order to activate the same, whereupon the catalyst may be placed on stream either in the reactor vessel 10 or in a separate reactor vessel. Obviously, if the catalyst is to be utilized in a separate reactor vessel a connection between the reactor vessel and the discharge conduit 20 will be arranged near the distributor grid so that the catalyst may be removed from the reactor vessel 10.

As an alternative to the above procedure, the hydrogen fluoride treatment or the hydrogen fluoride treatment and the sulfiding of the alumina can be effected in reactor vessel 10, whereupon the treated alumina is removed from reactor vessel 10 and transferred to a mixing vessel such as a Simpson mixer for impregnation with the catalytic metal compound by spraying, atomization or the like and sulfiding, if necessary, to fix the catalytic metal.

The alumina which is used in the preparation of catalysts in accordance with the present invention are the well known activated aluminas of commerce. Three activated aluminas which are suitable for the preparation of catalysts in accordance with the present invention are the following grades of Alorco alumina manufactured by the Aluminum Company of America:

| Alorco Grade | F-10 | R-2396 | H-41 |
| --- | --- | --- | --- |
| Surface area, m.$^2$/g | 90-125 | 135-240 | 200-300 |
| Pore Size, Angstroms | 40 | | 30 |
| Porosity, percent | 35 | | 50 |
| Approximate Analysis, wt. percent: | | | |
| $Al_2O_3$ | 96 | 96 | 90 |
| $SiO_2$ | 0.1 | 0.75 | 5.5 |
| $Na_2O$ | 0.1 | | 0.1 |
| $Fe_2O_3$ | 0.05 | | 0.12 |
| Loss on Ignition at 950° F | 3.0 | | 8.5 |

It will be understood that the foregoing activated aluminas are merely typical of those that may be used in accordance with the present invention and that other activated aluminas of commerce may be used.

The treatment of the activated alumina with hydrogen fluoride may be affected at temperatures of from ordinary room temperature up to about 1100° F. The treatment is ordinarily continued until from 0.2 to 10 wt. per cent of HF has been deposited on the alumina. The HF may be applied alone or in admixture with an inert diluent gas such as nitrogen or carbon dioxide.

The catalytic metals that may be incorporated in accordance with this invention are platinum or palladium. These metals are applied in solution and accordingly soluble compounds such as chloroplatinic acid, ammonium chloroplatinate, palladium chloride, etc. are used. The amount of catalytic metal in the finished catalyst is ordinarily between about 0.01 and about 5.0 wt. per cent. In the case of platinum the amount is preferably between 0.01 and 1.0 wt. per cent and in the case of palladium the amount is preferably between 0.01 and 5.0 wt. per cent.

The catalyst prepared in accordance with the present invention is especially suitable for hydroforming hydrocarbon fractions boiling within the motor fuel boiling range. Hydroforming reaction conditions are from about 600° F. to 1000° F., preferably 800–950° F. at pressures of from atmospheric to 1000 lbs. per sq. inch at naphtha feed rates of about 0.25 to 4 v./v./hr. (volumes of liquid feed per volume of catalyst per hour) preferably 1 to 2 v./v./hr. in a fixed bed unit and the hydrogen-containing recycle gas is recycled at a rate of about 2000–12,000, preferably about 6,000 cu. ft. per barrel of feed. In the hydroforming process the recycle or hydrogen-rich gas should contain about 60–99% hydrogen by volume. In general, higher feed rates produce essentially the same yield of gasoline but the octane number and volatility are reduced appreciably.

The platinum-containing catalyst prepared in accordance with the present invention when used in hydroforming give good results at high pressures of from about 500–1000 lbs. per sq. inch but they are especially effective at low pressures of 50 to about 250 lbs. per sq. inch. In low pressure operation it is necessary, periodically to remove carbonaceous deposits from the catalyst which may be done by discontinuing the feed and continuing the circulation of hydrogen-rich gas at the same temperature and pressure or higher temperatures than are applied during the reaction phase of the operation.

The following examples are illustrative of the present invention:

*Example I*

400 g. of H–41 alumina, previously pulverized so that 100% passes through a 35 mesh screen and dried at 270° F. was treated in the fluidized state at 900° F. with a mixture of nitrogen and anhydrous HF (HF 4.4% vol.) at 0.5 ft./sec. velocity, in sufficient amount to deposit 0.5% HF. The resultant HF-containing alumina was impregnated, in a porcelain dish, with a 440 cc. solution of 53 g. 10% $H_2PtCl_6 \cdot 6H_2O$. $H_2S$ was then fed into the slightly fluid paste while it was being stirred with a glass stirrer, and by hand with a spatula for 1½ hours. The mixture was then dried 16 hours at 250° F., pilled and heat-treated at 950° F. for 2 hours.

Tests on this catalyst under hydroforming conditions in a fixed bed reactor (200 p. s. i. g., 900° F., 1.1 w./w./hr., 3-hour process cycle at 6000 C. F./B. gas rate and a 6-hour hydrogen regeneration cycle at the equivalent of 12,000 C. F./B. gas rate, feeding a 200-300° F. heavy naphtha) gave a product as follows:

| Type Regen. | Cycles, Avg. | Total Overhead | | Debut. Overhead, CFR-Res-Clear |
|---|---|---|---|---|
| | | ° API | An. Pt., ° F. | |
| H₂ | 1-3 | 46 | 15 | 96. |
| H₂ | 4-6 | 45 | 13 | 96 Est. |
| H₂ | 7-9 | 45 | 14 | 96 Est. |
| H₂ | 16-18 | 47 | 30 | 94 Est. |

*Example II*

600 g. of H-41 alumina, previously pulverized so that 100% passed through a 35 mesh screen and dried at 270° F. was treated in the fluidized state at room temperature with a mixture of nitrogen and anhydrous HF (4.4% vol.) at 0.5 ft./sec. velocity in an amount sufficient to deposit 0.3% HF.

416 g. of this HF treated alumina was placed in a glass tube measuring about 2 in. diameter by 4 ft. height, the bottom of which was fitted with a porous fritted glass plate and the top was closed with a cellulose thimble. The tube was maintained in a vertical position and hydrogen sulfide passed upwards through the catalyst mass at a rate sufficient to keep it fluidized, for a period of ¾ hour. After this time the catalyst mass was removed to an open porcelain dish and spread in a thin layer. It was then sprayed with a 310 cc. distilled water solution of 46.4 g. 10% chloroplatinic acid ($H_2PtCl_6.6H_2O$), which latter contained the equivalent of 1.75 g. platinum metal. While being sprayed, the mass was mixed with a spatula in order to distribute the solution as evenly as possible. The impregnated material was dried in a steam oven at 250° F. for 16 hours, pilled and heat-treated 2 hours at 950° F. The finished catalyst showed by analysis 0.35% HF and 0.54% platinum.

This catalyst, on being tested under similar conditions to those cited for Example I gave fair but less outstanding results, as follows:

| Type Regen. | Cycles, Avg. | Total Overhead | | Debut. Overhead, CFR-Res-Clear |
|---|---|---|---|---|
| | | ° API | An. Pt., ° F. | |
| H₂ | 1-4 | 47 | 37 | 92 (Est.) |
| H₂ | 12-13 | 49 | 58 | 85 (Est.) |
| Air | 14 | 49 | 40 | 90 (Est.) |
| Air | 15 | 49 | 50 | 85 (Est.) |
| Air | 16 | 50 | 57 | 87 (Est.) |

The foregoing specification contains a limited number of embodiments of the present invention. It will be understood, however, that numerous variations are possible without departing from the scope of the following claims.

What is claimed is:

1. A process of manufacturing catalysts consisting of a metal selected from the group consisting of platinum and palladium carried upon an alumina spacing agent which comprises passing an inert gas through finely divided alumina catalyst support particles to form a dense, fluidized, liquid-simulating bed, passing hydrogen fluoride and inert gas through said fluidized bed at temperatures from room temperature to about 1100° F. to incorporate from 0.2 to about 10 wt. per cent of fluoride ion in said support treating the fluoride containing support with a solution of a compound selected from the group consisting of chloroplatinic acid, ammonium chloroplatinate, and palladium chloride and with hydrogen sulfide to thereby incorporate 0.01 to 5.0 weight per cent of the catalytic metal on said support, drying and calcining the resultant composition.

2. A process of manufacturing catalysts consisting of a metal selected from the group consisting of platinum and palladium carried upon an alumina spacing agent which comprises passing an inert gas through finely divided alumina catalyst support particles to form a dense, fluidized, liquid-simulating bed, passing hydrogen fluoride and inert gas through said fluidized bed at temperatures of from room temperature to about 1100° F. to incorporate from 0.2 to about 10 wt. per cent of fluoride in said support, contacting the fluoride treated support with hydrogen sulfide and then contacting the sulfided support with a solution of a compound selected from the group consisting of chloroplatinic acid, ammonium chloroplatinate and palladium chloride to thereby incorporate 0.1 to 5.0 weight per cent of the catalytic metal upon said support, drying and calcining the resultant composition.

3. A process of manufacturing catalysts consisting of a metal selected from the group consisting of platinum and palladium carried upon an alumina spacing agent which comprises passing an inert gas through finely divided alumina catalyst support particles to form a dense, fluidized, liquid-simulating bed, passing hydrogen fluoride and inert gas through said fluidized bed at temperatures of from room temperature to about 1100° F. to incorporate from 0.2 to about 10 wt. per cent of fluoride in said support, adding a solution of a compound selected from the group consisting of chloroplatinic acid, ammonium chloroplatinate and palladium chloride to the fluoride treated support in sufficient amount to incorporate 0.01 to 5.0 wt. per cent of the catalytic metal thereon, thereafter contacting the same with hydrogen sulfide to fix the catalytic metal upon said support, drying and calcining the resultant composition.

4. A process for manufacturing catalysts comprising a metal from the group consisting of platinum and palladium carried upon an activated alumina support which comprises passing an inert gas through finely divided activated alumina particles to form a dense, fluidized, liquid-simulating bed, passing hydrogen fluoride an inert gas through said fluidized bed at temperatures of from room temperature to about 1100° F. to incorporate from 0.2 to about 10 wt. per cent of fluorine ion in said alumina treating the fluoride-containing alumina with a solution of a compound selected from the group consisting of chloroplatinic acid, ammonium chloroplatinate and palladium chloride and with hydrogen sulfide to thereby incorporate 0.01 to 5.0 weight per cent of the catalytic metal on said alumina, drying and calcining the resultant composition.

5. A process for manufacturing catalysts comprising a metal from the group consisting of platinum and palladium carried upon an activated alumina support which comprises passing an inert gas through finely divided activated alumina particles to form a dense, fluidized, liquid-simulating bed, passing hydrogen fluoride and inert gas through said fluidized bed at temperatures of from room temperature to about 1100° F. to incorporate 0.2 to about 10 wt. per cent of fluorine ion in said alumina, contacting the fluoride treated alumina with hydrogen sulfide and then contacting the sulfided support with a solution of a compound selected from the group consisting of chloroplatinic acid, ammonium chloroplatinate and palladium chloride to thereby incorporate 0.01 to 5.0 weight per cent of the catalytic metal upon said support, drying and calcining the resultant composition.

6. A process for manufacturing catalysts comprising a metal from the group consisting of platinum and palladium carried upon an activated alumina support which comprises passing an inert gas through finely divided activated alumina particles to form a dense, fluidized, liquid-simulating bed, passing hydrogen fluoride and inert gas through said fluidized bed at temperatures of from room temperature to about 1100° F. to incorporate from 0.2 to about 10 wt. per cent of fluorine ion in said alumina, adding a solution of a compound selected from the group consisting of chloroplatinic acid, ammonium chloroplatinate and palladium chloride to the fluoride treated alumina in sufficient amount to incorporate 0.01 to 5.0 wt. per cent of the catalytic metal upon the alumina, thereafter contacting the same with hydrogen sulfide to fix the catalytic metal upon the alumina support, drying and calcining the resultant composition.

References Cited in the file of this patent

UNITED STATES PATENTS

| | | |
|---|---|---|
| 2,005,412 | Connolly et al. | June 18, 1935 |
| 2,154,527 | Pier et al. | Apr. 18, 1939 |
| 2,246,900 | Schulze et al. | June 24, 1941 |
| 2,479,109 | Haensel | Aug. 16, 1949 |
| 2,533,071 | Vesterdal | Dec. 5, 1950 |
| 2,561,422 | Shabaker | July 24, 1951 |
| 2,580,004 | Corneil | Dec. 25, 1951 |